(12) United States Patent
Doolittle et al.

(10) Patent No.: US 10,624,272 B1
(45) Date of Patent: Apr. 21, 2020

(54) TREE PUNCH AND TREE PLUG INSERTION TOOL

(71) Applicants: Glayne Doolittle, Omaha, NE (US); Michael Frisina, Omaha, NE (US)

(72) Inventors: Glayne Doolittle, Omaha, NE (US); Michael Frisina, Omaha, NE (US)

( * ) Notice: Subject to any disclaimer, the term of this patent is extended or adjusted under 35 U.S.C. 154(b) by 434 days.

(21) Appl. No.: 15/643,964

(22) Filed: Jul. 7, 2017

(51) Int. Cl.
*A01G 7/06* (2006.01)

(52) U.S. Cl.
CPC ..................... *A01G 7/06* (2013.01)

(58) Field of Classification Search
CPC .................. A01G 7/06; A01G 29/00
See application file for complete search history.

(56) References Cited

U.S. PATENT DOCUMENTS

| 1,058,138 | A | * | 4/1913 | Ballou | A01G 29/00 111/7.1 |
| 3,706,161 | A | | 12/1972 | Jenson | |
| 3,864,874 | A | | 2/1975 | Norris et al. | |
| 5,239,773 | A | | 8/1993 | Doolittle, Jr. | |
| 5,797,215 | A | | 8/1998 | Doolittle et al. | |
| 10,462,979 | B1 | * | 11/2019 | Doolittle | A01G 7/06 |

FOREIGN PATENT DOCUMENTS

CA 2827607 A1 * 8/2012 ............... A01G 7/06

* cited by examiner

*Primary Examiner* — Kristen C Hayes
(74) *Attorney, Agent, or Firm* — Dennis L. Thomte; Thomte Patent Law Office LLC

(57) ABSTRACT

A tool including a tree punch for forming holes in a tree. The tool also includes a tree plug insertion tool for inserting cylindrical tree plugs into the holes created by the tree punch.

10 Claims, 9 Drawing Sheets

TREE PUNCH AND TREE PLUG INSERTION TOOL

BACKGROUND OF THE INVENTION

Field of the Invention

This invention relates to a tool for punching a hole in a tree with the tool also being used to insert a tree plug into the hole formed in the tree.

Description of the Related Art

It has previously been known to form holes in the exterior of a tree and to implant capsules of nutrients or treatment fluids into those holes. Representative tree injection capsules are disclosed in Jenson U.S. Pat. No. 3,706,161 and Norris et al. U.S. Pat. No. 3,864,874. Both patents show and suggest that the capsules are inserted into pre-drilled holes of a depth extending through and beyond the cambium layer of the tree. The drilling of a hole beyond the cambium layer of a tree, however, injures the tree and triggers a defensive reaction of the tree to wall off the injured area thereby losing stored food that would otherwise be available for growth. The size of the xylem is reduced and an air pocket in contact the xylem allows decay.

Successful injection of nutrients and treatment chemicals into a tree was accomplished with the improved tree injection system of U.S. Pat. No. 5,239,773 wherein a specially designed fluid injection needle could be inserted at an angle through the bark of a tree to contact the xylem layer of the tree, but without penetrating or damaging the xylem layer. This system works best during the period of the year of active growth of the tree. In the Midwestern United States, this period extends for five to six months, including April, May, June, July, August and some of September. Thereafter, the tree tends to shutdown and cannot as effectively hold the injected fluid in a bubble between the xylem and inner bark layers of the tree. Outside of the growing season, the injected fluid tends to lead outwardly through the hole formed by the fluid injection treatment. The invention of U.S. Pat. No. 5,797,215 was designed to extend the portion of the year in which trees may be injected with fluids by plugging the hole into which the liquid chemicals are injected and preventing them from running out prior to being taken up by the tree. U.S. Pat. No. 5,239,773 describes at Column 6, lines 23-27 that when the needle is removed, the bark and cambium close the needle hole because of their resiliency. This does not always happen early or late in the growing season, on certain trees such as the linden tree or on overcast days. The process of keeping the chemical in the tree was facilitated by the apparatus and method of the invention of U.S. Pat. No. 5,797,215.

In each of the plugs of the '215 patent, the outer end thereof has an outer flange at the outer end thereof. Although the plugs of the '215 patent have met with considerable success, the flanges thereof limited the inward movement of the plug into the tree. Further, the flanges at the outer ends of the plugs required that the plugs had to be individually fed into the tree.

Applicants have previously provided a tool for punching a hole in a tree to facilitate the insertion of a tree plug therein. In the prior art tool, after the tool has been used to punch a hole in the tree, the installer then manually grasps a tree plug and attempts to position the tree plug in the hole in the tree. Frequently, the installer will drop the individual tree plug onto the ground and would then attempt to find the tree plug and insert it into the opening in the tree.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A tree punch and tree plug insertion tool is disclosed which includes an elongated and cylindrical hollow body member having an open first end and an open second end. The tool also includes an adapter, having an inner end and an outer end, with the inner end of the adapter having a reduced diameter portion, with inner and outer ends, which is configured to be received in the open first end of the body member. A disc-shaped member is provided at the second end of the reduced diameter portion of the adapter with the disc-shaped member having inner and outer sides. The disc-shaped member has a greater diameter than the reduced diameter portion of the adapter. The adapter also includes a generally V-shaped adapter portion having an inner end, an outer end, a first side and a second side. The generally V-shaped adapter portion extends outwardly from the outer side of the disc-shaped member. The adapter has an elongated bore formed therein which extends therethrough from its inner end to its outer end. The adapter has a rectangular-shaped first slot extending transversely between the first and second sides of the V-shaped adapter portion at the inner end of the V-shaped adapter portion. The rectangular-shaped first slot transversely intersects the elongated bore. The first side of the V-shaped adapter portion has a rectangular-shaped second slot formed therein which extends thereinto and which communicates with the elongated bore. The rectangular-shaped second slot is configured to receive a cylindrical tree plug therein. The rectangular-shaped first slot is configured to receive an elongated rectangular strap or plug carrier which has a plurality of the tree plugs selectively removably attached thereto.

A cap is positioned in the open second end of the body member with the cap having a central bore extending therethrough. An elongated first rod, having first and second ends, is also provided. The first rod slidably extends through the central portion of the cap whereby the inner end of the first rod is positioned in the body member and wherein the outer end of the first rod is positioned outwardly of the cap and the body member. The first rod is selectively movably between extended and retracted positions with respect to the cap and the body portion. A knob is secured to the outer end of the first rod. The tool also includes an elongated first coil spring, having inner and outer ends, with the first coil spring embracing the first rod in the body member. The first coil spring yieldably maintains the first rod in its retracted position. The inner end of the first rod slidably extends into the elongated bore in the adapter when in its extended position. The inner end of the first rod engages the tree plug in the rectangular-shaped second slot when the first rod is moved from its retracted position to its extended position to push the tree plug outwardly from the elongated bore into the preformed opening in a tree.

The tool also includes an elongated hollow punch tube having inner and outer ends with the inner end of the punch tube being positioned in the body member with the inner end of the punch tube having a guide opening formed therein.

The punch tube is secured to the body member so that the punch tube extends transversely from the body member. A hollow punch, having inner and outer ends, is also provided with the inner end of the hollow punch being received in the outer end of the punch tube. The tool also includes an elongated second rod, having inner and outer ends, with the second rod being slidably mounted in the punch tube adjacent the inner end thereof. An elongated pin is also provided which has inner and outer ends with the pin being slidably mounted in the punch tube outwardly of the second rod. The inner end of the pin is in engagement with the outer end of the second rod. The tool also includes an elongated second coil spring, having inner and outer ends, with the second coil spring embracing the pin. The outer end of the second coil spring is in engagement with the inner end of the punch. The second rod and the pin are movable between extended and retracted positions with respect to the punch tube. The tool also includes a second coil spring which yieldably maintains the second rod and the pin in the retracted position. The outer end of the pin extends through the punch when the second rod and the pin are in their extended position. The tool further includes an elongated pivotal actuator, having inner and outer ends, with the inner end of the actuator extending into the punch tube inwardly of the inner end of the second rod. The actuator is pivotally movable between first and second positions so that when the actuator is moved from its first position to its second position, it causes the second rod and the pin to be moved from their retracted position to their extended position against the yieldable resistance of the second coil spring.

In use, the punch tube is positioned so that the outer end of the punch is pressed against the tree. The punch tube is then moved towards the tree so that the outer end of the punch cuts into the tree with a portion of the tree being received into the interior of the punch. The tool is then moved away from the tree with a cylindrical portion of the tree being pulled outwardly from the tree to create a hole in the tree. The actuator is then moved so that the second rod and the associated pin are moved to their extended position so that the pin engages the tree portion in the punch to eject the same from the punch.

If not already done so, one end of the plug carrier is inserted into the first slot in the adapter with the leading tree plug being inserted into the second slot in the adapter until the leading tree plug is aligned with the elongated bore. The outer end of the adapter is then positioned with respect to the tree so that the outer end of the elongated bore in the adapter registers with the outer end of the hole formed in the tree. The knob on the outer end of first rod is then moved towards the body member so the outer end of the first rod moves outwardly in the elongated bore in the adapter thereby detaching the leading tree plug from the plug carrier and then pushes the detached tree plug into the hole in the tree. The above steps are successively repeated to insert the tree plugs into other holes in the tree.

It is therefore a principal object of the invention to provide an improved tree punch and tree plug insertion tool.

A further object of the invention is to provide a tree punch and tree plug insertion tool which enables tree plugs to be inserted into the tree in a much more efficient manner than previously possible.

A further object of the invention is to provide a tree punch and tree plug insertion tool wherein the tree plugs thereof are mounted on a tree plug carrier.

A further object of the invention is to provide a tree punch and tree plug insertion tool which eliminates the need for individual tree plugs to be manually grasped and inserted into the opening of the tree.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
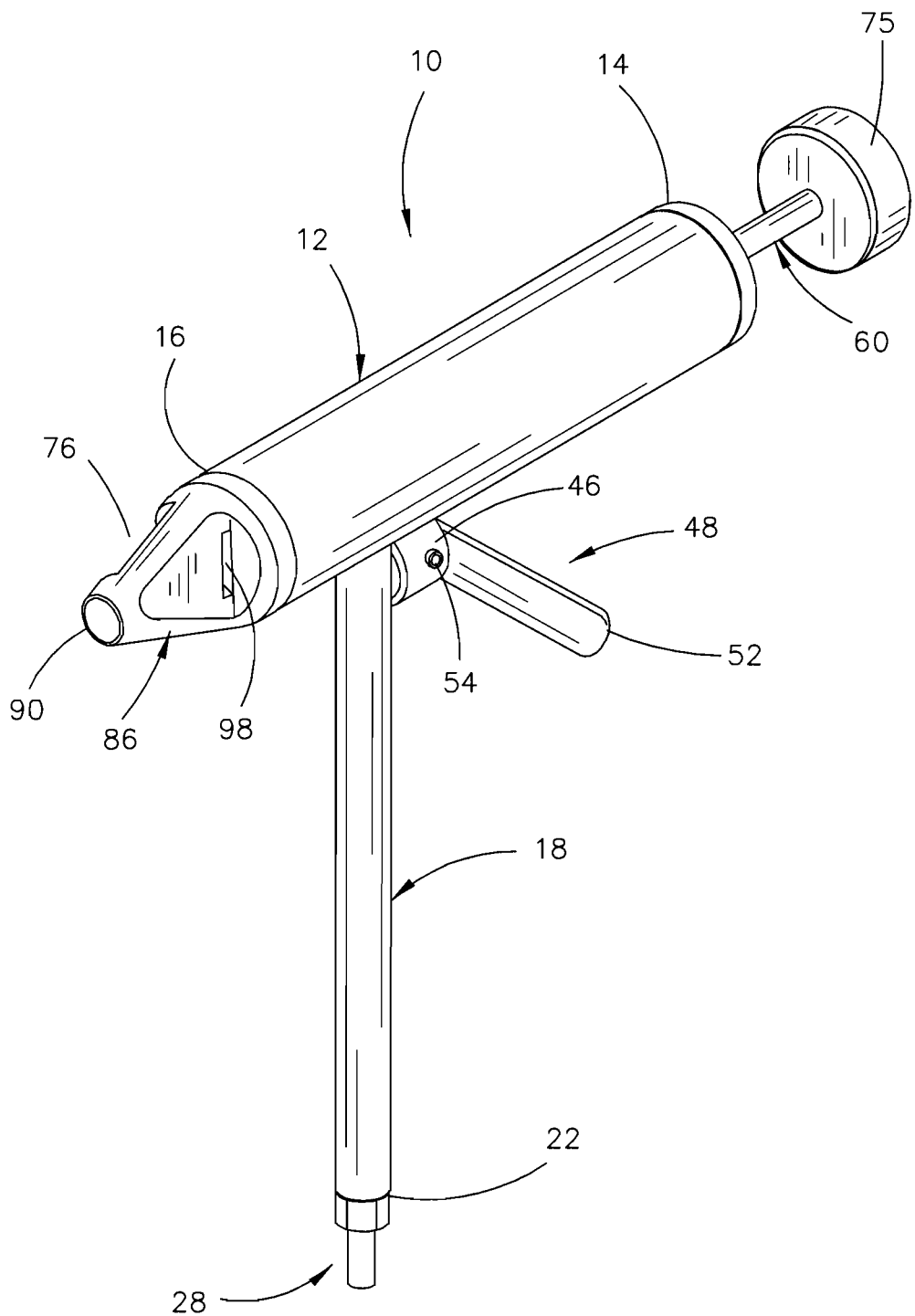
FIG. 1 is a perspective view of the tool of this invention.
Figure 2:
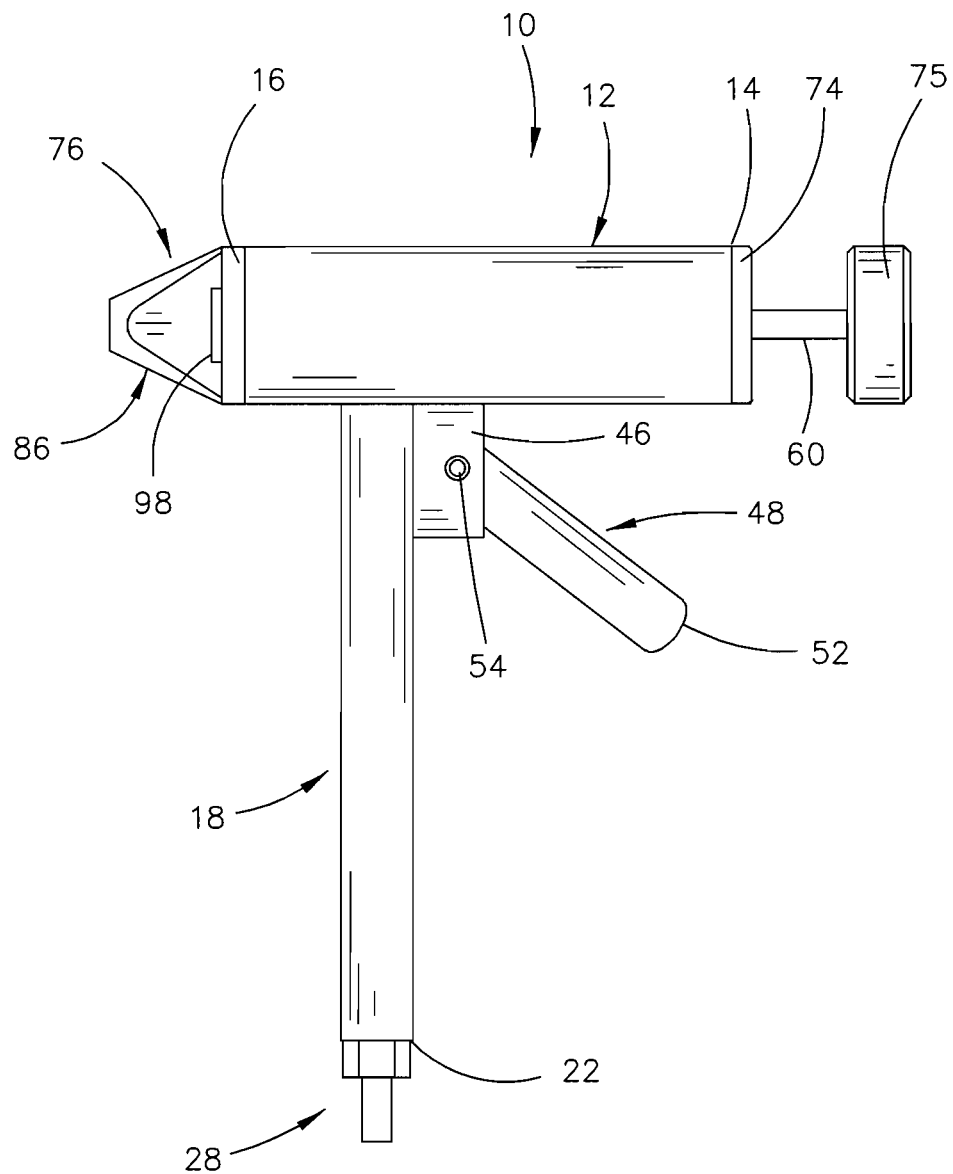
FIG. 2 is a side view of the tool of this invention.
Figure 3:
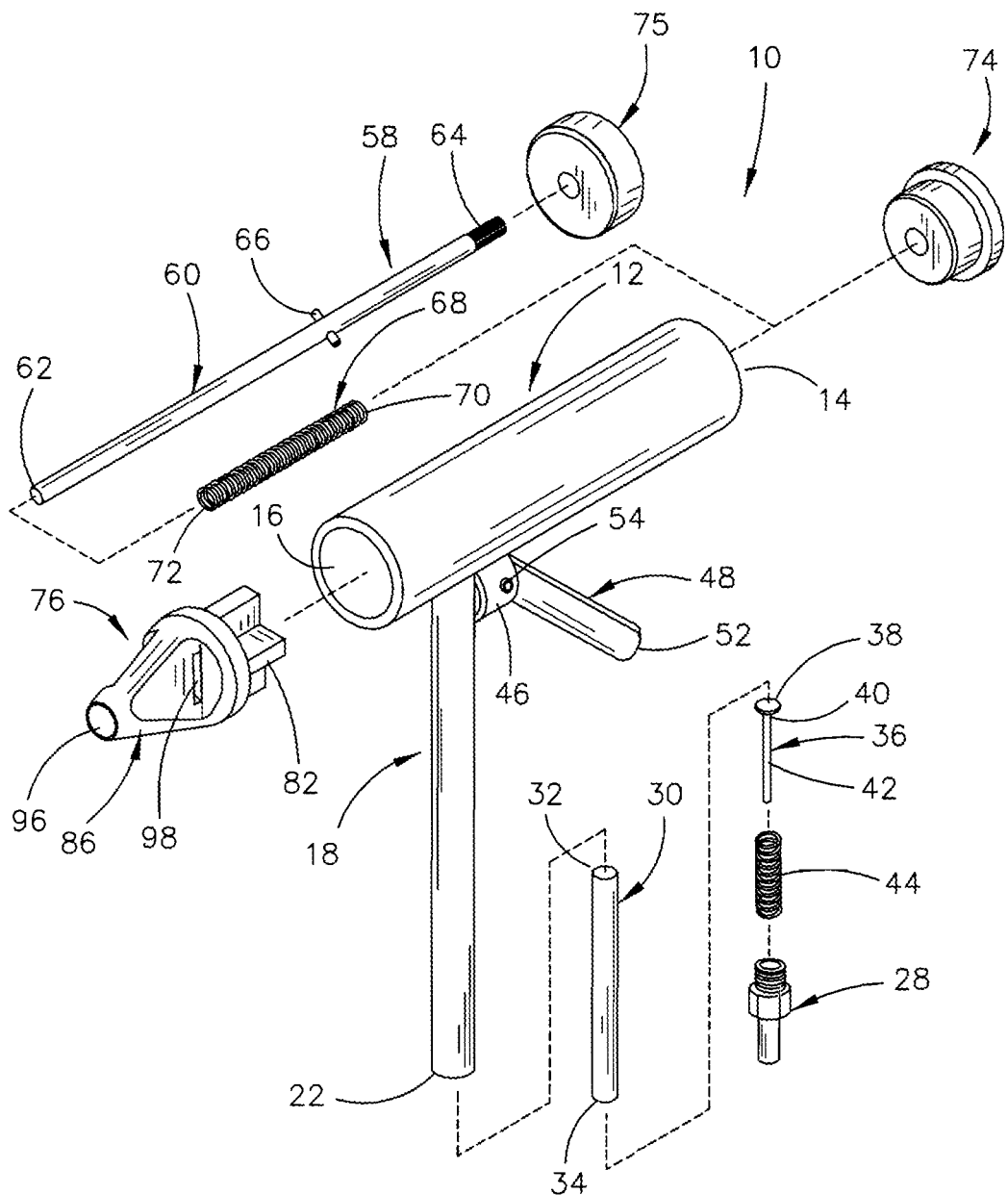
FIG. 3 is an exploded perspective view of the tool of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a tree punch and tree plug insertion tool. Tool 10 includes a hollow and elongated body portion 12 having open ends 14 and 16. Tool 10 also includes an elongated tube 18 having an inner end 20 and an outer end 22. The inner end 20 of tube 18 extends inwardly into the interior of body portion 12 and has a shaft opening 24 formed therein. Tube 18 is welded to body portion 26 with tube 18 and extends transversely from body portion 12. A hollow punch tip 28 is threadably secured to the outer end 22 of tube 18. The length of the punch tip 28 will vary depending upon the size of the tree being injected.

Tube 18 has an elongated cylindrical member 30 slidably mounted therein which has an inner end 32 and an outer end 34. Tube 18 also includes a pin 36 which is slidably mounted therein and which has an enlarged head 38 at its inner end 40 and a shaft 42 extending outwardly therefrom. A coil spring 44 embraces shaft 42. The head 38 of pin 36 abuts the outer end 34 of cylindrical member 30. The outer end of shaft 42 is slidably mounted in punch tip 28 between retracted and extended positions.

The numeral 46 refers to a ring-shaped mount which is welded to body portion 12 and tube 18 as seen in the drawings. The numeral 48 refers to a lever or trigger having an inner end 50 and an outer end 52. Lever 48 extends through mount 46 and is pivotally secured thereto by pin 54. The inner end of lever 48 extends through a slot 56 formed in tube 18 whereby the inner end 50 of lever 48 is positioned at the inner end 32 of cylindrical member 30. The spring 44 yieldably maintains lever 48 in the position of FIG. 4 whereby the outer end of shaft 42 is positioned inwardly of the outer end of punch tip 28.

Figure 4:
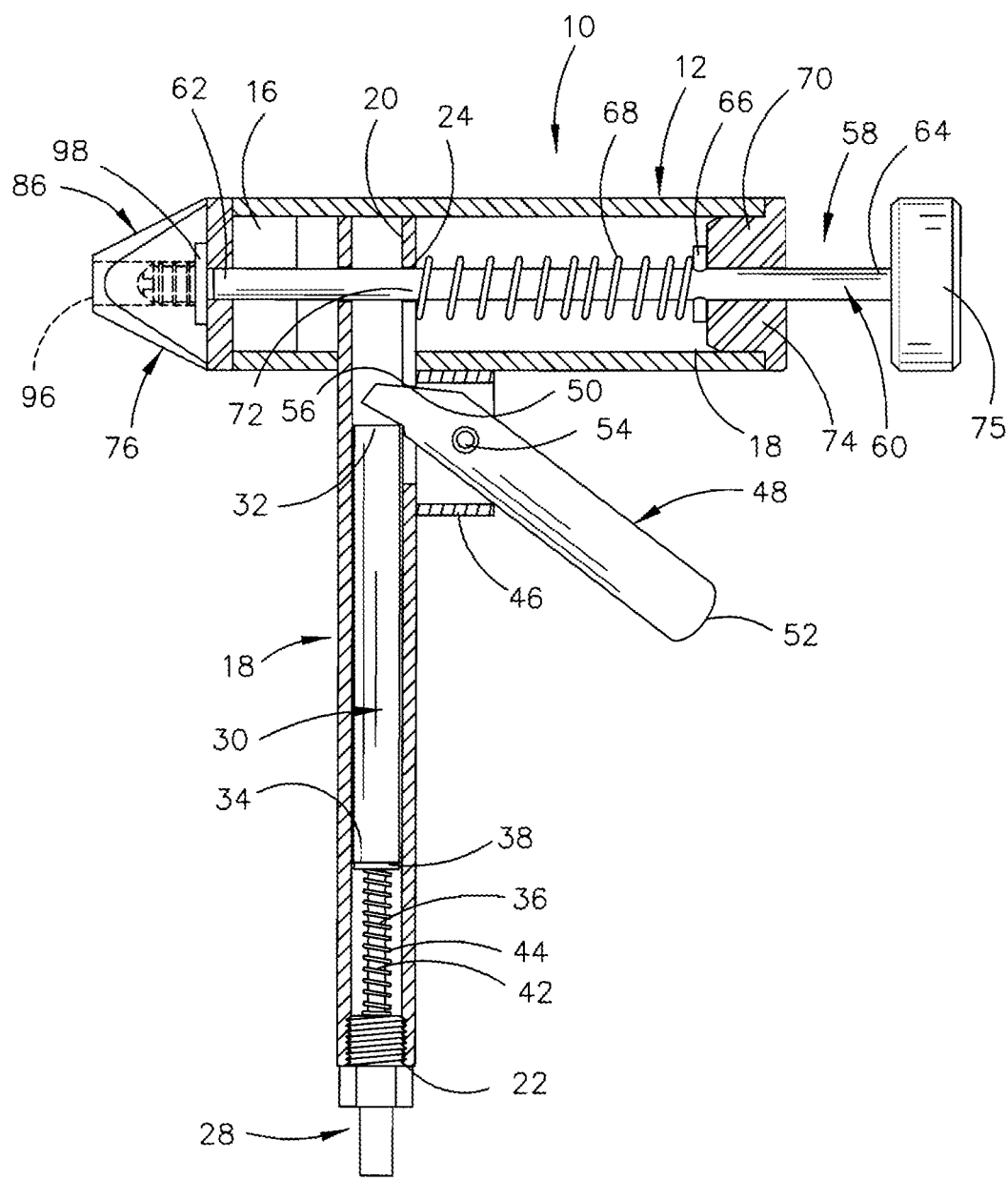
FIG. 4 is a sectional view of the tool of this invention.
Figure 5:
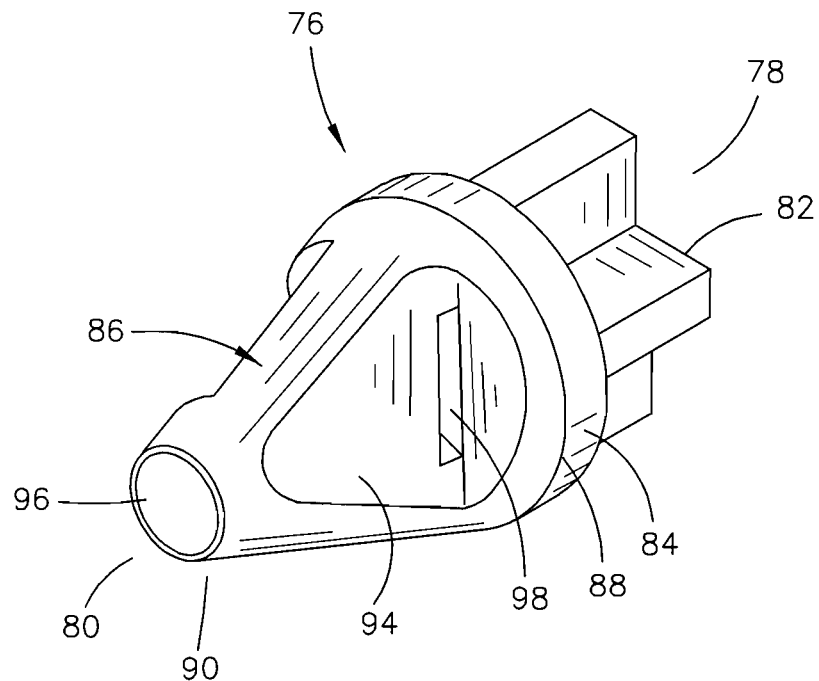
FIG. 5 is a perspective view of the adapter of this invention.

The numeral 58 refers to a plug ejector assembly which is mounted in body portion 12. Assembly 58 includes an elongated, cylindrical shaft 60 having an inner end 62 and an outer end 64. A pin 66 extends transversely through shaft 60 as seen in FIG. 4. A coil spring 68, having an outer end 70 and an inner end 72, embraces shaft 60 inwardly of pin 66 with the outer end 70 of spring 68 engaging pin 66. Shaft 60 slidably extends through a retainer plug 74 which is press-fitted into the open end 14 of body portion 12. The outer end 64 of shaft 60 is positioned outwardly of retainer plug 74 and has a knob 76 secured thereto. Shaft 60 slidably extends through shaft opening 24 of tube 18. Spring 68 normally yieldably maintains shaft 60 in its retracted position of FIG. 4.

The numeral 76 refers to a tree plug support or adapter having an inner end 78 and an outer end 80. Adapter 76 includes a reduced diameter portion 82 at its inner end which is configured to be press-fitted into the open end 16 of body portion 12. A disc-shaped member 84 is positioned at the outer end of the reduced diameter portion 82. Member 84 has a greater diameter than the reduced diameter portion 82. Adapter 76 includes a generally V-shaped adapter portion 86 having an inner end 88, an outer end 90, a first side 92 and a second side 94. The V-shaped adapter portion 86 extends outwardly from the outer side of the disc-shaped member 84. Adapter 76 has an elongated bore 96 formed therein which extends therethrough from the inner end thereof to the outer end thereof.

Figure 6:
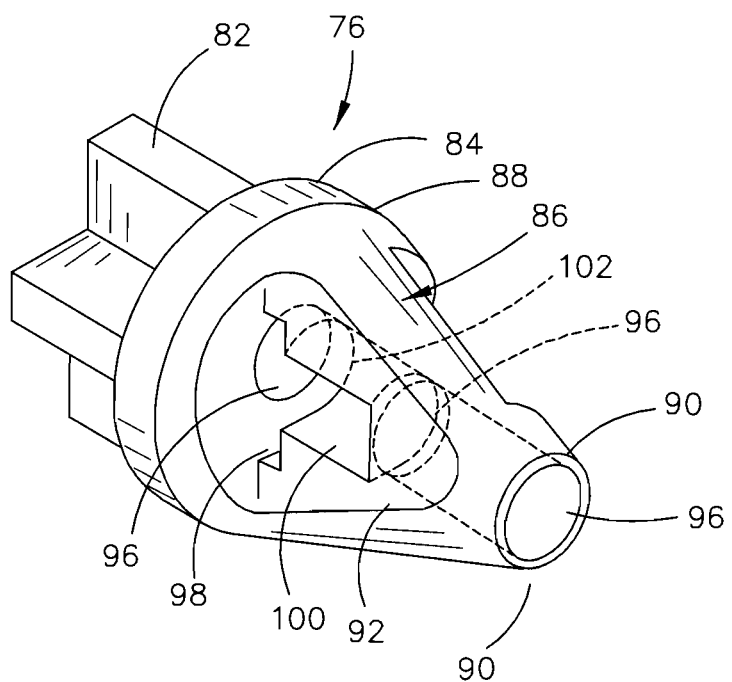
FIG. 6 is another perspective view of the adapter of this invention.
Figure 8:
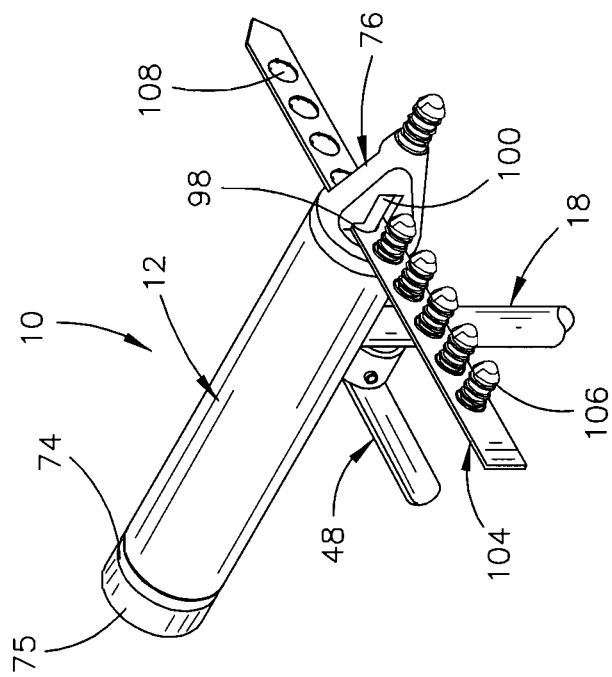
FIG. 8 is a perspective view illustrating the manner in which the strap of FIG. 7 is extended through the adapter of this invention as the tree plugs are inserted into a tree.
Figure 7:
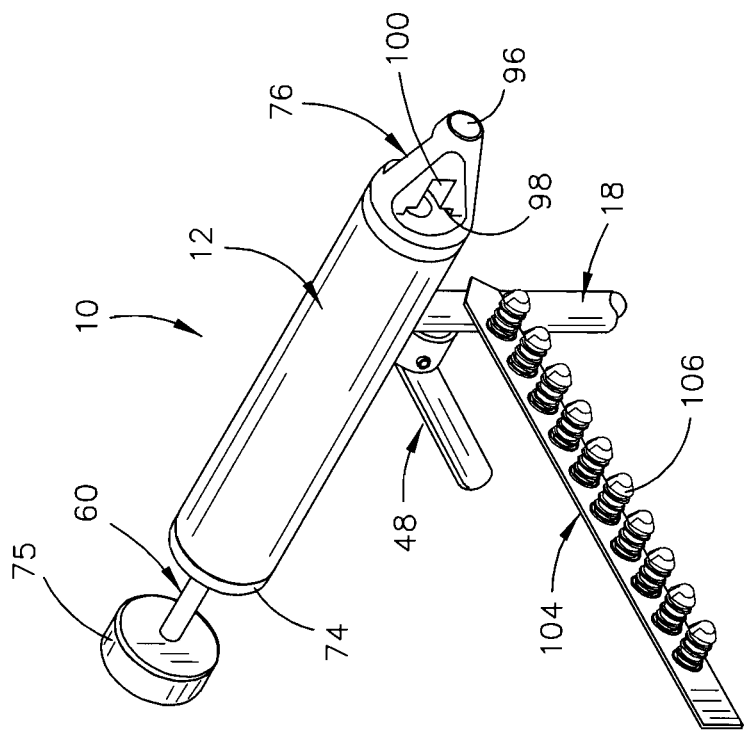
FIG. 7 is a perspective view illustrating a strap of tree plugs about to be inserted into the adapter of this invention.
Figure 9:
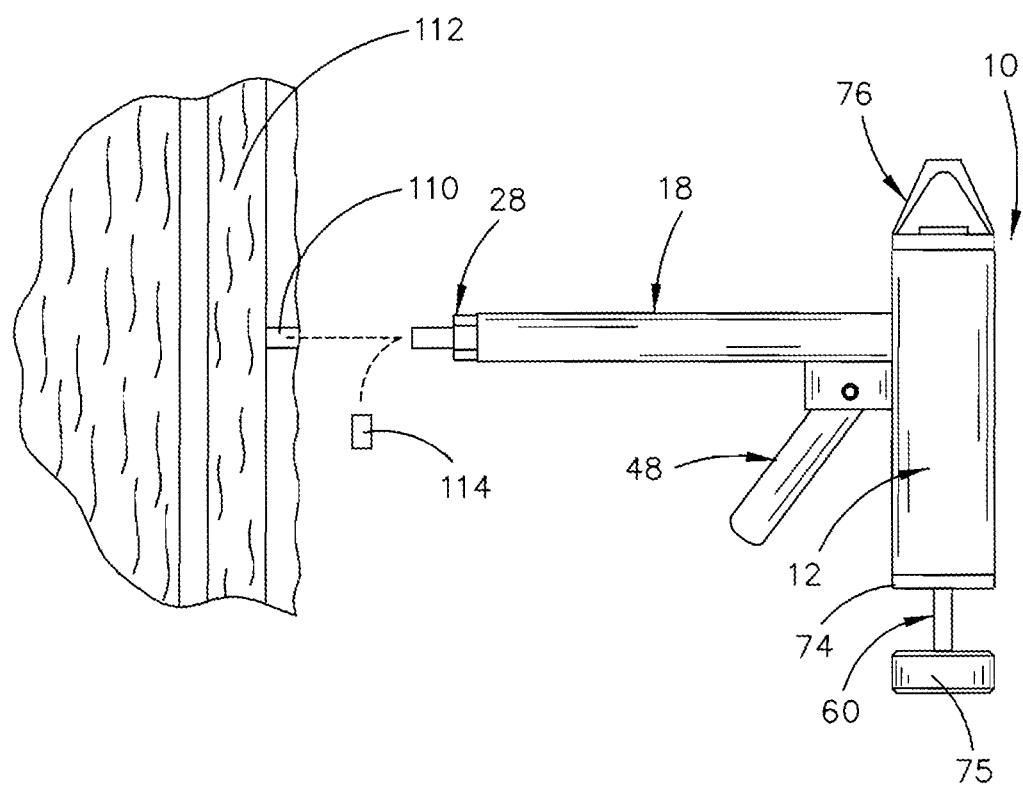
FIG. 9 is a side view illustrating the manner in which the material from the opening in the tree is discharged from the punch portion of the tool after a hole has been formed in the tree.
Figure 10:
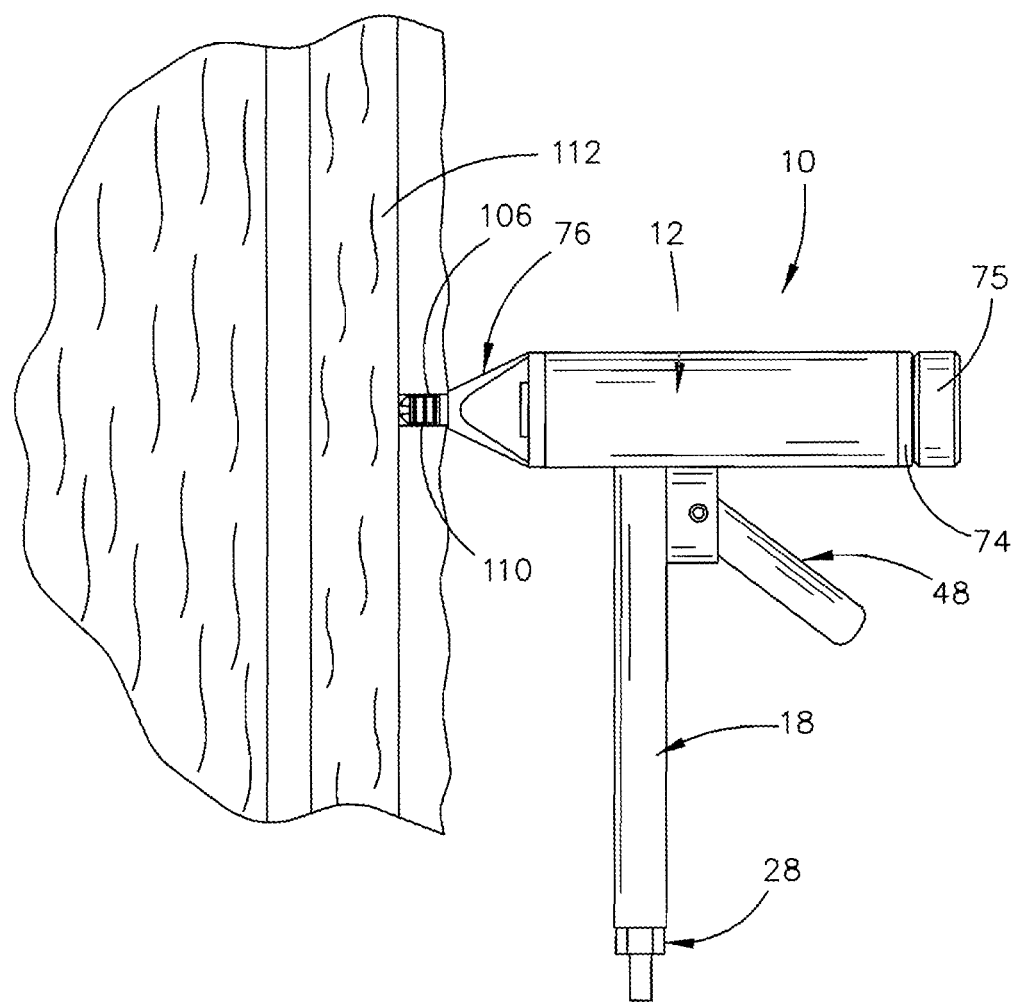
FIG. 10 is a side view illustrating the tool of this invention inserting a tree plug into the opening formed in the tree.
Figure 11:
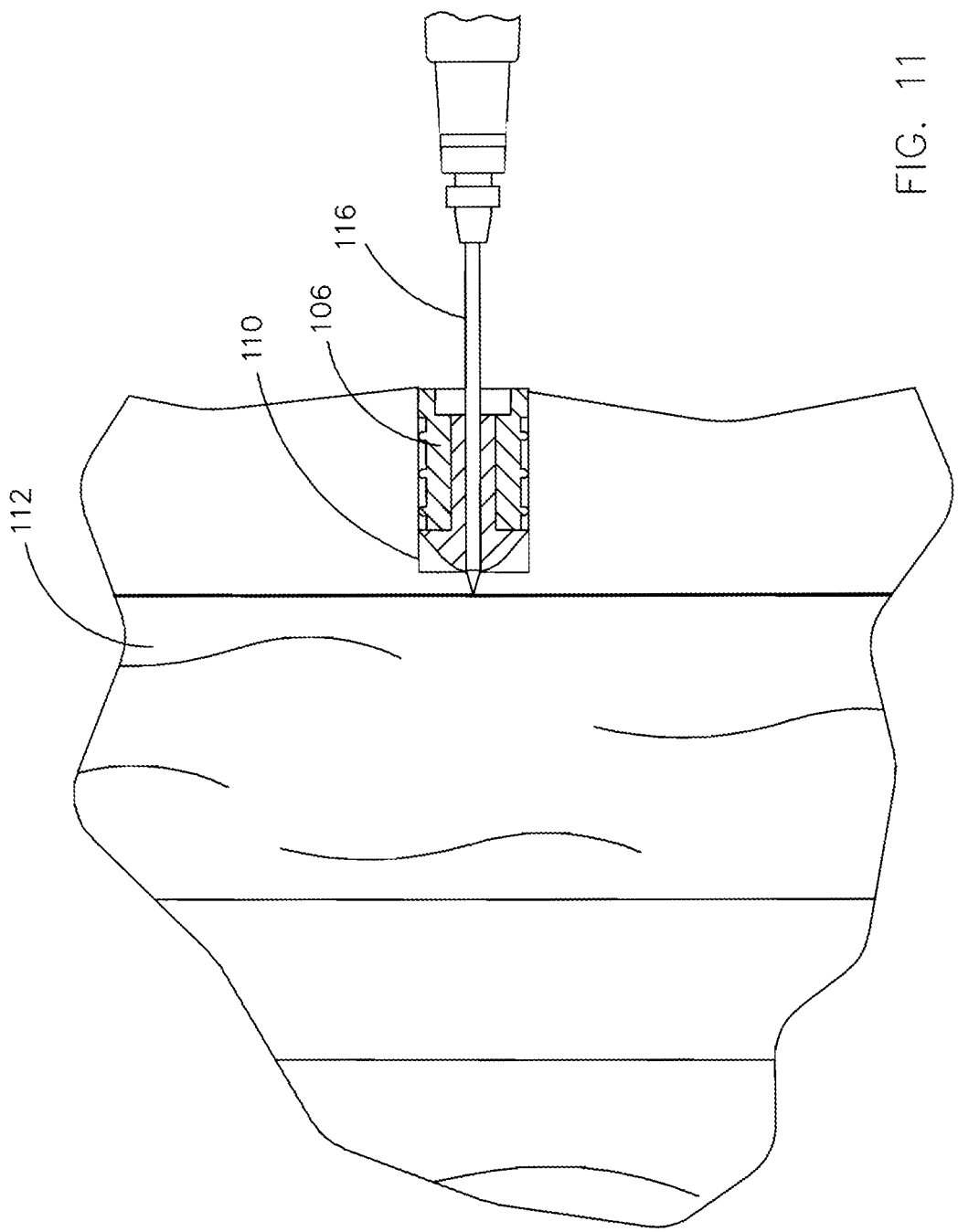
FIG. 11 is a partial sectional view illustrating injection fluid being inserted into the tree.

Adapter 76 includes a rectangular first slot 98 formed therein which extends between sides 92 and 94 of adapter portion 86. As seen in FIG. 6, slot 98 transversely intersects bore 96. Adapter portion 86 has a second semi-circular or rectangular slot 100 formed therein which extends inwardly thereinto from side 92. Slot 100 does not extend completely through adapter portion 86 with the inner end thereof intersecting bore 96 to form a shoulder or stop 102. The numeral 104 refers to an elongated strap or plug carrier 104 having tree or injection plugs 106 molded therewith. Each of the plugs 106 is cylindrical with the base ends thereof selectively removably secured in openings 108 in strap 104.

In use, the punch tube 18 is positioned so that the outer end of the punch 28 is pressed against the tree. The punch tube 18 is then moved towards the tree so that the outer end of the punch 28 cuts into the tree with a portion of the tree being received into the interior of the punch 28. The tool 10 is then moved away from the tree with the cylindrical portion 114 of the tree being pulled outwardly from the tree to create a hole 110 in the tree. The actuator 48 is then moved so that the second rod 30 and the associated pin 36 are moved to their extended positions so that the pin 36 engages the tree portion 114 in the punch 28 to eject the portion 114 from the punch 28.

If not already done so, one end of the plug carrier 104 is inserted into the first slot 98 in the adapter 76 with the leading tree plug 106 on the carrier 100 being inserted into the second slot 100 in the adapter 76 until the leading tree plug 106 engages the stop 102 and is aligned with the elongated bore 96. The outer end of the adapter 76 is then positioned with respect to the tree so that the outer end of the elongated bore 96 in the adapter 76 registers with the outer end of the hole 110 formed in the tree. The knob 75 on the outer end of first rod 60 is then moved towards the body member 12 so the outer end 62 of the first rod 60 moves outwardly in the elongated bore 96 in the adapter 76 thereby detaching the leading tree plug 106 from the plug carrier 104 and then pushes the detached tree plug 106 into the hole 110 in the tree. The above steps are successively repeated to insert the tree plugs into holes in the tree.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A tree punch and tree plug insertion tool, comprising:

an elongated and cylindrical hollow body member having an open first end and an open second end;

an adapter having an inner end and an outer end;

said inner end of said adapter having a reduced diameter portion, with inner and outer ends, which is configured to be received in said open first end of said body member;

a disc-shaped member at said inner end of said reduced diameter portion with said disc-shaped member having inner and outer sides;

said disc-shaped member having a greater diameter than said reduced diameter portion;

said adapter including a generally V-shaped adapter portion having an inner end, an outer end, a first side and a second side;

said generally V-shaped adapter portion extending outwardly from said outer side of said disc-shaped member;

said adapter having an elongated bore formed therein which extends therethrough from its said inner end to its said outer end;

said adapter having a rectangular-shaped first slot extending transversely between said first and second sides of said V-shaped adapter portion at said inner end of said V-shaped adapter portion;

said rectangular-shaped first slot transversely intersecting said elongated bore;

said first side of said V-shaped adapter portion having a rectangular-shaped second slot, having inner and outer ends, formed therein which extends inwardly thereinto and which communicates with said first slot at said elongated bore;

said inner end of said second slot and said elongated bore forming a plug stop;

said rectangular-shaped second slot being configured to receive a cylindrical tree plug therein with said stop limiting the inward movement of the plug whereby the plug is aligned with said elongated bore;

a cap positioned in said open second end of said body member;

said cap having a central bore extending therethrough;

an elongated first rod having inner and outer ends;

said first rod slidably extending through said central bore of said cap whereby said inner end of said first rod is positioned in said body member and wherein said outer end of said first rod is positioned outwardly of said cap and said body member;

said first rod being selectively movable between extended and retracted positions with respect to said body member;

a knob secured to said outer end of said first rod;

an elongated first coil spring having inner and outer ends;

said first coil spring embracing said first rod in said body portion;

said first coil spring yieldably maintaining said first rod in said retracted position;

said inner end of said first rod slidably extending into said elongated bore in said adapter when in its said extended position;

said inner end of said first rod engaging the tree plug in said rectangular-shaped second slot when said first rod is moved from its said retracted position to its said extended position to push the tree plug outwardly from said elongated bore into a preformed opening in a tree;

an elongated hollow punch tube having inner and outer ends;

said inner end of said punch tube being secured to said body member;

said punch tube extending transversely from said body member;

a hollow punch having inner and outer ends;

said inner end of said hollow punch being received in said outer end of said punch tube;

an elongated second rod having inner and outer ends;

said second rod being slidably mounted in said punch tube at said inner end thereof;

an elongated pin having inner and outer ends;

said pin being slidably mounted in said punch tube outwardly of said second rod;

said inner end of said pin being in engagement with said outer end of said second rod;

an elongated second coil spring having inner and outer ends;

said second coil spring embracing said pin;

said outer end of said second coil spring being in engagement with inner end of said punch;

said second rod and said pin being movable between extended and retracted positions with respect to said punch tube;

said second coil spring yieldably maintaining said second rod and said pin in said retracted positions;

said outer end of said pin extending through said punch when said second rod and said pin are in their said extended positions;

an elongated pivotal actuator having inner and outer ends;

said inner end of said actuator extending into said punch tube inwardly of said inner end of said second rod;

said actuator being pivotally movable between first and second positions;

said actuator, when moved from its said first position to its said second position, causing said second rod and said pin to be moved from their retracted positions to their said extended positions against the yieldable resistance of said second coil spring.

2. The tree punch and tree plug insertion tool of claim 1 wherein said inner end of said punch tube is positioned in said body member.

3. The tree punch and tree plug insertion tool of claim 2 wherein inner end of said punch tube has an opening formed therein and wherein said first rod slidably extends through said opening in said inner end of said punch tube.

4. The tree punch and tree plug insertion tool of claim 1 further including a flexible and elongated tree plug support strap, having inner and outer ends, has a plurality of spaced-apart tree plugs mounted thereon, with said tree plug support strap being selectively movably inserted into said first rectangular-shaped slot of said V-shaped adapter portion which causes the innermost tree plug on said tree plug support strap to be positioned in said second rectangular-shaped slot in said V-shaped adapter portion and whereby said extension of said elongated first rod from its said retracted position to its said extended position will cause the tree plug in said second slot to be discharged outwardly from said outer end of said elongated bore in said adapter.

5. A tree punch and tree plug insertion tool, comprising:

an elongated and cylindrical hollow body member having an open first end and an open second end;

an adapter having an inner end and an outer end;

said inner end of said adapter being configured to be received in said open first end of said body member;

said adapter including a generally V-shaped adapter portion having an inner end, an outer end, a first side and a second side;

said generally V-shaped adapter portion extending outwardly from said inner end of said adapter;

said adapter having an elongated bore formed therein which extends therethrough from its said inner end to its said outer end;

said adapter having a rectangular-shaped first slot extending transversely between said first and second sides of said V-shaped adapter portion at said inner end of said V-shaped adapter portion;

said rectangular-shaped first slot transversely intersecting said elongated bore;

said first side of said V-shaped adapter portion having a rectangular-shaped second slot, having inner and outer ends, formed therein which extends inwardly thereinto and which communicates with said first slot at said elongated bore;

said inner end of said second slot and said elongated bore forming a plug stop;

said rectangular-shaped second slot being configured to receive a cylindrical tree plug therein with said stop limiting the inward movement of the plug whereby the plug is aligned with said elongated bore;

a cap positioned in said open second end of said body member;

said cap having a central bore extending therethrough;

an elongated first rod having inner and outer ends;

said first rod slidably extending through said central bore of said cap whereby said inner end of said first rod is positioned in said body member and wherein said outer end of said first rod is positioned outwardly of said cap and said body member;

said first rod being selectively movable between extended and retracted positions with respect to said body member;

a knob secured to said outer end of said first rod;

an elongated first coil spring having inner and outer ends;
said first coil spring embracing said first rod in said body portion;
said first coil spring yieldably maintaining said first rod in said retracted position;
said inner end of said first rod slidably extending into said elongated bore in said adapter when in its said extended position;
said inner end of said first rod engaging the tree plug in said rectangular-shaped second slot when said first rod is moved from its said retracted position to its said extended position to push the tree plug outwardly from said elongated bore into a preformed opening in a tree;
an elongated hollow punch tube having inner and outer ends;
said inner end of said punch tube being secured to said body member;
said punch tube extending transversely from said body member;
a hollow punch having inner and outer ends;
said inner end of said hollow punch being received in said outer end of said punch tube;
an elongated second rod having inner and outer ends;
said second rod being slidably mounted in said punch tube at said inner end thereof;
an elongated pin having inner and outer ends;
said pin being slidably mounted in said punch tube outwardly of said second rod;
said inner end of said pin being in engagement with said outer end of said second rod;
an elongated second coil spring having inner and outer ends;
said second coil spring embracing said pin;
said outer end of said second coil spring being in engagement with inner end of said punch;
said second rod and said pin being movable between extended and retracted positions with respect to said punch tube;
said second coil spring yieldably maintaining said second rod and said pin in said retracted positions;
said outer end of said pin extending through said punch when said second rod and said pin are in their said extended positions;
an elongated pivotal actuator having inner and outer ends;
said inner end of said actuator extending into said punch tube inwardly of said inner end of said second rod;
said actuator being pivotally movable between first and second positions; and
said actuator, when moved from its said first position to its said second position, causing said second rod and said pin to be moved from their retracted positions to their said extended positions against the yieldable resistance of said second coil spring.

6. The tree punch and tree plug insertion tool of claim 5 wherein said inner end of said punch tube is positioned in said body member.

7. The tree punch and tree plug insertion tool of claim 6 wherein inner end of said punch tube has an opening formed therein and wherein said first rod slidably extends through said opening in said inner end of said punch tube.

8. The tree punch and tree plug insertion tool of claim 5 further includes a flexible and elongated tree plug support strap, having inner and outer ends, which has a plurality of spaced-apart tree plugs mounted thereon, with said tree plug support strap being selectively movably inserted into said first rectangular-shaped slot said V-shaped adapter portion which causes the innermost tree plug on said tree plug support strap to be positioned in said second rectangular-shaped slot in said V-shaped adapter portion and whereby said extension of said elongated first rod from its said retracted position to its said extended position will cause the tree plug in said second slot to be discharged outwardly from said outer end of said elongated bore in said adapter.

9. A tree plug insertion tool, comprising:
an elongated and cylindrical hollow body member having an open first end and an open second end;
an adapter having an inner end and an outer end;
said inner end of said adapter being configured to be received in said open first end of said body member;
said adapter including a generally V-shaped adapter portion having an inner end, an outer end, a first side and a second side;
said generally V-shaped adapter portion extending outwardly from said inner end of said adapter;
said adapter having an elongated bore formed therein which extends therethrough from its said inner end to its said outer end;
said adapter having a rectangular-shaped first slot extending transversely between said first and second sides of said V-shaped adapter portion at said inner end of said V-shaped adapter portion;
said rectangular-shaped first slot transversely intersecting said elongated bore;
said first side of said V-shaped adapter portion having a rectangular-shaped second slot, having inner and outer ends, formed therein which extends inwardly thereinto and which communicates with said first slot at said elongated bore;
said inner end of said second slot and said elongated bore forming a plug stop;
said rectangular-shaped second slot being configured to receive a cylindrical tree plug therein with said stop limiting the inward movement of the plug whereby the plug is aligned with said elongated bore;
a cap positioned in said open second end of said body member;
said cap having a central bore extending therethrough;
an elongated first rod having inner and outer ends;
said first rod slidably extending through said central bore of said cap whereby said inner end of said first rod is positioned in said body member and wherein said outer end of said first rod is positioned outwardly of said cap and said body member;
said first rod being selectively movable between extended and retracted positions with respect to said body member;
a knob secured to said outer end of said first rod;
an elongated first coil spring having inner and outer ends;
said first coil spring embracing said first rod in said body portion;
said first coil spring yieldably maintaining said first rod in said retracted position;
said inner end of said first rod slidably extending into said elongated bore in said adapter when in its said extended position; and
said inner end of said first rod engaging the tree plug in said rectangular-shaped second slot when said first rod is moved from its said retracted position to its said extended position to push the tree plug outwardly from said elongated bore into a preformed opening in a tree.

10. The tree punch and tree plug insertion tool of claim 9 further including a flexible and elongated tree plug support strap, having inner and outer ends, has a plurality of spaced-apart tree plugs mounted thereon, with said tree plug support strap being selectively movably inserted into said first rectangular-shaped slot of said V-shaped adapter portion which causes the innermost tree plug on said tree plug support strap to be positioned in said second rectangular-shaped slot in said V-shaped adapter portion and whereby said extension of said elongated first rod from its said retracted position to its said extended position will cause the tree plug in said second slot to be discharged outwardly from said outer end of said elongated bore in said adapter.

* * * * *